March 2, 1965 C. E. LINNANDER 3,171,375
MACHINE FOR THE MANUFACTURE OF BEAMS AND THE LIKE
Filed March 19, 1962 2 Sheets-Sheet 2
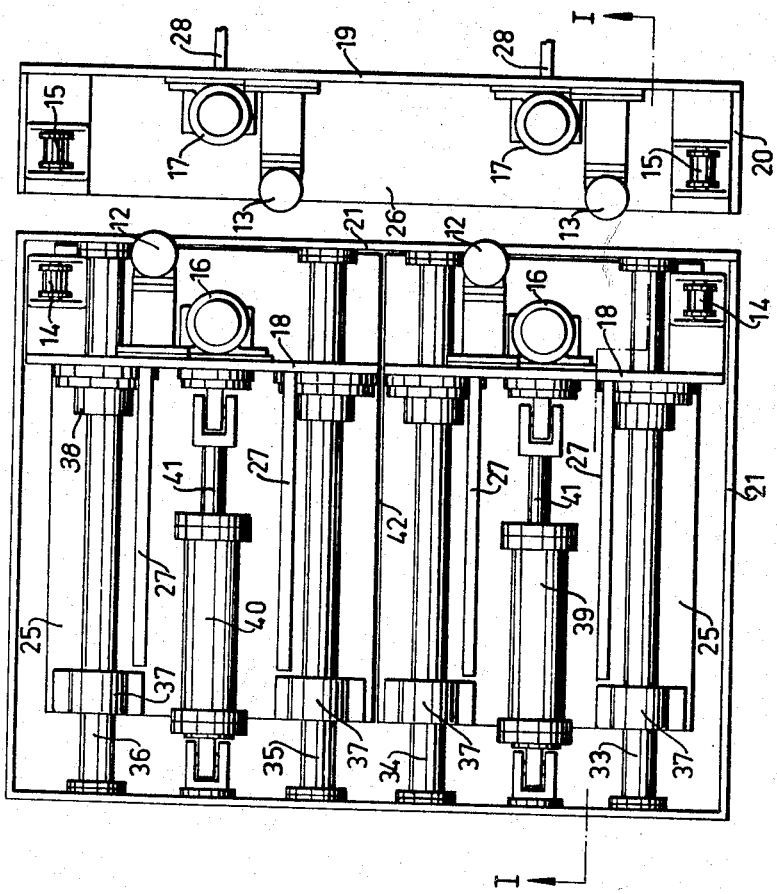

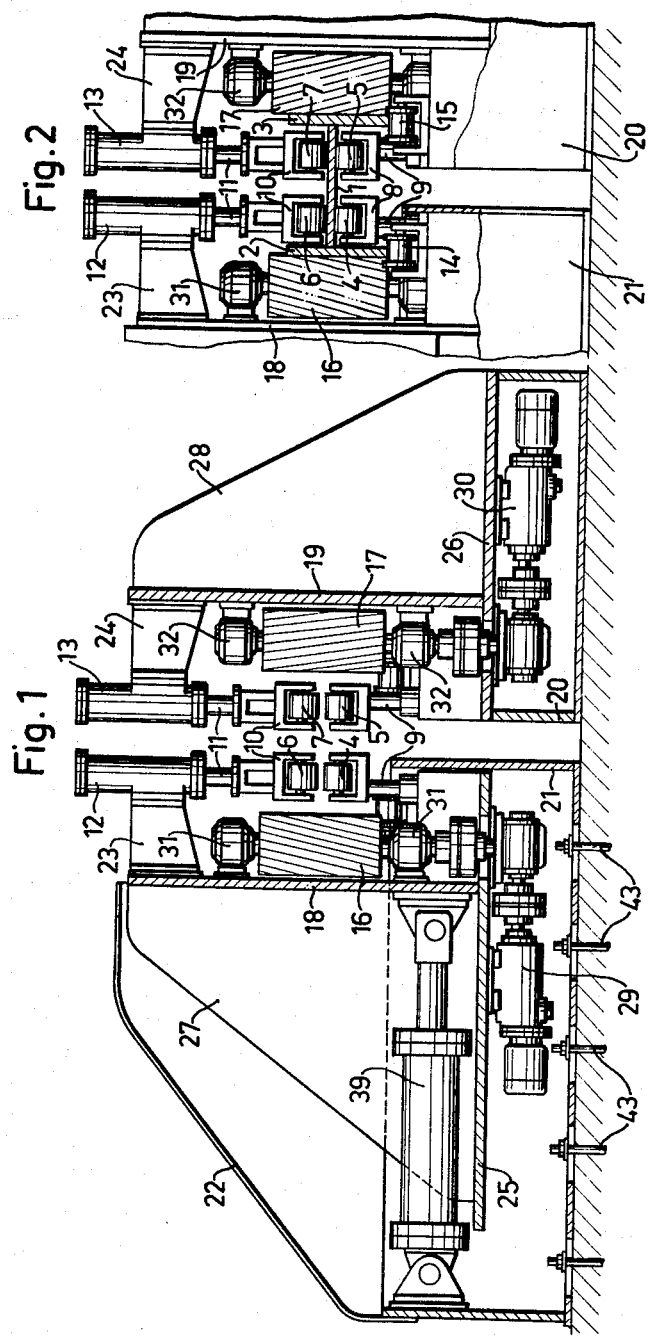

United States Patent Office 3,171,375
Patented Mar. 2, 1965

3,171,375
MACHINE FOR THE MANUFACTURE OF
BEAMS AND THE LIKE
Carl Eric Linnander, Goteborg, Sweden, assignor to
Pullmax Aktiebolag, Goteborg, Sweden, a corporation
of Sweden
Filed Mar. 19, 1962, Ser. No. 180,621
Claims priority, application Sweden, Mar. 23, 1961,
3,087/61
15 Claims. (Cl. 113—131)

It is known to manufacture beams by welding together strip-shaped plates or channel elements in such relative positions that the composed structure exhibits the desired beam section. For instance, a T-beam may be made of two plate strips corresponding to the web plate and the flange plate, said strips being welded together after they have been fixed in a relative position corresponding to the T-section. In a similar way an I-beam may be manufactured by welding together a plate strip corresponding to the web plate and two strips corresponding to the two flange plates. It is important that these sectional elements are firmly and immovably held in their relative position during the welding. Up till now fixtures have been used for this purpose, wherein the various parts of the beam are aligned and engaged throughout the length of the beam by means of screw joints or the like.

The present invention has for its object to simplify the operation of aligning and fixing the sectional elements in such a way which enables a continuous, automatic working procedure to be carried out while the sectional elements are fed along through a machine adapted for the purpose. The invention is chiefly characterized in that the sectional elements are guided, while being fed along in their longitudinal direction, between laterally effective backing members in such a way that they are caused to assume proper relative positions in a path of travel defined by the backing members, the elements at the same time being pressed against each other at the joints. Aligning and fixing of the sectional elements thus occur continuously according as they are fed along in their path of travel. Thus the machinery necessary herefor only has to extend along a part of the total length of the beam. From the moment when the sectional elements are fed into the machine they are guided into their corresponding path of travel by backing members in the forms of rollers or the like, which support the sectional elements laterally so that they are automatically brought together and fixed in the proper relative position during a continuous longitudinal travel. After the sectional elements have thus been fixed against each other a welding operation may be performed, either while the sectional elements are continuously fed along or in steps after the feeding movement has been intermittently stopped.

The invention may also be applied to other beam sections than the above mentioned, for instance, in manufacturing U-beams. Also beams having a closed, for instance rectangular, cross sectional configuration may be manufactured in this way. The individual sectional elements need not comprise flat plate elements but may have themselves an arbitrary configuration forming part of the composed section of the beam.

The invention will be described in greater detail below with reference to the annexed drawings, in which FIGS. 1–3 show an embodiment of a machine according to the invention. FIG. 1 shows a vertical section along line I—I in FIG. 3. FIG. 2 shows a part of the machine as viewed from its front end, "front" referred to the direction of travel of the beam elements. FIG. 3 is a plan view of the machine.

The machine shown in FIGS. 1–3 is intended for the manufacture of I-beams, preferably of iron or steel sheet, the beam elements being fed through the machine in a manner illustrated in FIG. 2. The beam elements comprise a strip-shaped web plate 1 and two likewise strip-shaped flange plates 2, 3. The web plate is fed in a horizontal plane between a lower group of backing rollers 4 and 5 and an upper group of backing rollers 6 and 7. The rollers 4, 5 are mounted in brackets 8 supported by standards 9 adjustable as to their height. The rollers 6, 7 are mounted in brackets 10 secured to the lower end of piston rods 11 which are adjusted vertically by means of pistons pneumatically or hydraulically actuable in cylinders 12 and 13. The flange plates 2, 3 run in upright position on rollers 14, 15 and are guided laterally by rollers 16, 17 which are motor driven and rotatable about vertical axes. At the same time the flanges 2, 3 are strongly pressed by these rollers against the edges of the web plate 1 so that the contact pressure necessary for the welding is attained in the unwelded joints. The rollers 16, 17 serve at the same time for propelling the beam plates. They are provided with inclined flutes or knurles in such a way that they exert during rotation a downwardly directed pressure on the flange plates 2, 3 whereby these plates are firmly pressed against the support rollers 14 and 15. The machine is intended to guide the beam plates in their travelling path along a distance which is shorter than the total length of the beam.

As shown in FIG. 1 the rollers are mounted in two frames 18, 19, whereof frame 19 is rigidly secured on a floor base by way of a box-like bottom portion 20, while frame 18 is adjustable horizontally within a box-like structure 21 partly covered by a top member 22. The frame 19 contains the rollers operating on the right flange plate and adjacent edge of the web plate while the frame 18 supports the rollers operating on the left side. As seen in FIG. 3 there are in each frame 18 and 19 two vertical backing rollers 16 and 17, respectively, and two pairs of vertically aligned backing rollers 4, 6 and 5, 7 respectively. The upper rollers are actuated by each its working cylinder 12 and 13, respectively, while the lower rollers 4, 5 may be raised and lowered by means of devices, not shown, mounted in the frames. The working cylinders 12, 13 are suspended from arms 23, 24 extending from the frames 18, 19. The two frames have each its pair of the support rollers 14 and 15, respectively, disposed at the inlet and outlet ends of the machine.

The two frames 18, 19 comprise a vertical frame plate secured to a base plate 25 and 26, respectively, and is strutted against this plate by means of gusset plates 27 and 28, respectively. The motors 29 and 30 for driving the rollers 16 and 17, respectively, and associated gearing members are mounted on the underside of the bottom plates 25 and 26, respectively, and are connected to the rollers by vertical shafts mounted in bearings 31, 32 secured to the vertical frame plates 18 and 19, respectively.

The movable frame 18, 25 is supported by four parallel guide rods 33, 34, 35, 36, FIG. 3, which guide the frame when this is adjusted in relationship to the stationary frame 19, 26. The guide rods are secured at their opposite ends to the opposed end walls of the box frame 21. On these guide rods the bottom plate 25 is displaceably carried by means of slide bearings 37, 38. Adjustment of the frame is carried out by means of two piston and cylinder actuators 39, 40 which may be driven pneumatically or hydraulically. The cylinders are pivotably secured to the back end wall of the frame box while the piston rods 41 are pivoted to the vertical frame plate 18. In order to render possible a certain displacement between the back and front backing rollers 16, the frame 18, 25 is divided along a center line 42.

The machine is used in the following way. The web and flange plates 1, 2, 3 are first fed into the machine until their leading ends reach the back end of the frames and rest upon the rollers 14, 15 located at this end, the plates then lying comparatively loose in their path of travel which is confined by the backing roller. Thereupon the upper backing rollers 6, 7 are pressed into engagement with the web plate by means of the pressing devices 12, 13. After the web plate thus has been fixed on the proper level, the frame 18, 25 is pushed by means of the actuators 39, 40 against the stationary frame 19, 26, and the flange plates are pressed into engagement against the edges of the web plate. The motors 29, 30 are then started, and the beam plates are thus fed along through the machine in a fixed position in relationship to each other until the whole beam has passed through the machine. By the action of the backing rollers the plates are not only fixed in relationship to each other but there is also provided alignment and smoothing of possible warped portions of the plates.

In order to adapt the positions of the backing rollers to various beam heights or web plate widths, the displacement just described of the movable frame may be insufficient on account of the limited length of the actuators. FIG. 1 illustrates how a further displacement may be brought about by adjusting the box frame 21 in relation to the floor or foundation. For this purpose the box frame is detachably secured to the foundation by means of bolts 43. After loosening the bolts the box frame may be displaced to the left, as viewed in the figure, and then it may be fixed again to the foundation by the bolt being pulled home. Said adjusting of the box frame may be carried out to advantage by means of the actuators 39, 40 by the frame 18, 25 temporarily being fixed in relation to the foundation. This may be brought about, for instance, by a temporary arrangement of struts or the like between the two vertical frame parts 18, 19, said struts preventing the movable frame from being displaced towards the stationary frame. Hence, when the actuators 39, 40 are caused to operate, the box frame 21 will be displaced to the desired position wherein it is fixed. After said struts have been removed, the actuators may be used in the manner previously described for lateral compression of the beam plates.

In welding unsymmetrical beam sections, for instance T-sections, it may occur that the beam is subjected to permanent deformations by the shrinking stresses remaining after welding. Thus it may occur that a T-beam is bent toward the web plate. As a matter of fact the web plate is heated during the welding operation so as to expand adjacent the edge engaging the flange plate, the beam then bending towards the flange plate. The shrinking occurring after cooling will not suffice for straightening the beam, which is thus permanently deformed. This inconvenience may be avoided according to the present invention by the backing members being arranged in such a way that pre-stresses are set up in the beam plates during their passage through the machine, which pre-stresses oppose and compensate for the tendency towards bending caused by the welding. The pre-stresses are suitably created by the beam plates being exposed to bending stresses which in turn generate material stresses opposing said tendency towards bending.

The welding may be performed in a manner known per se, either by means of stationary arranged welding members as mentioned above or by means of welding members adapted to be moved along the joints while the plates are at a standstill. In the last mentioned case the welding must of course be carried out in steps after the plates have been successively displaced a distance approximately corresponding to the length of the machine.

What is claimed is:

1. In a machine for the manufacturing of beams composed of web and flange elements adapted to be welded together while being advanced along a path of travel, means for feeding and positioning said elements comprising at least two sets of guide rollers spaced apart along said path of travel and arranged to hold said elements in proper mutual positions, each set of guide rollers comprising a movable pressure roller and a stationary backing roller disposed on opposite sides of the path of travel, separate and mutually independent fluid operated means for exerting a yielding pressure on the several movable rollers to keep the web and flange elements firmly pressed against the stationary backing rollers, and means for driving at least one of said rollers to advance said elements along said path of travel.

2. A machine as claimed in claim 1, in which the means for exerting a yielding pressure consist of piston-cylinder actuators arranged to move the appertaining pressure roller in the longitudinal direction of the actuators.

3. A machine as claimed in claim 1, in which the pressure rollers are motor driven and provided with separate and mutually independent driving motors for feeding the web and flange elements.

4. A machine as claimed in claim 1, in which the flange elements are guided laterally between stationary and movable rollers mounted with their axles in vertical positions and provided with separate and mutually independent motors, while the web element is guided between yielding pressure rollers and stationary rollers mounted with their axles in a horizontal position.

5. A machine as claimed in claim 4, in which the pressure rollers are motor driven and obliquely fluted in such a way as to press the flange elements downwards into engagement with supporting rollers arranged to guide the flange elements vertically.

6. In a machine for the manufacturing of beams composed of web and flange elements to be welded together while being advanced along a path of travel, means for feeding and positioning said elements comprising at least two sets of guide rollers spaced apart along said path of travel and arranged to hold said elements in proper mutual positions, each set of guide rollers comprising a pressure roller and a backing roller disposed on opposite sides of the path of travel, two frame portions supporting said guide rollers, one frame portion being stationary and carrying the backing rollers and the other frame portion being movable and carrying the pressure rollers, fluid operated means for exerting a yielding pressure on the movable frame portion to keep the web and flange elements firmly pressed against the stationary backing rollers, and means for driving at least one of said rollers to advance said elements along said path of travel.

7. A machine as claimed in claim 6, in which the movable pressure rollers of the respective sets are supported by separate frame portions provided with separate and mutually independent fluid operated means for exerting a yielding pressure on the appertaining pressure rollers.

8. A machine as claimed in claim 7, in which the means for exerting a yielding pressure consist of piston-cylinder actuators arranged to move the appertaining frame portions longitudinally of the actuators.

9. A machine as claimed in claim 6, in which the movable frame portion is mounted in a stationary box-shaped frame provided with guide bars for guiding the movable frame portion in a direction transversely of the path of travel of the web and flange elements and having piston-and cylinder actuators for displacing and exerting pressure on the movable frame portion.

10. A machine as claimed in claim 9, in which number of guide bars and piston-and-cylinder actuators are arranged parallelly and secured at one end to an end wall of the box-shaped frame and at the other end to a vertical mounting plate of the movable frame portion on which the pressure rollers are mounted.

11. A machine as claimed in claim 10, in which the box-shaped frame is detachably connected to the machine foundation and arranged to be displaced on said foundation after disconnection, by means of the piston-and-cylinder actuators.

12. A machine as claimed in claim 6, in which each frame portion comprises a vertical mounting plate carrying the guide rollers and a horizontal mounting plate carrying a motor equipment for driving the guide rollers.

13. In a machine for the manufacture of beams composed of web and flange elements welded together while being advanced along a path of travel, means for feeding and positioning said elements comprising a stationary frame and a movable frame, means for guiding said movable frame for movement toward and away from said stationary frame in a direction perpendicular to said path of travel, a plurality of guide rollers for guiding said beam elements comprising a first backing roller rotatably supported on said stationary frame with its axis perpendicular to said path of travel and to the direction of movement of said movable frame, a second backing roller rotatably supported on said stationary frame with its axis parallel to the direction of movement of said movable frame, a first pressure roller supported by said stationary frame for rotation about an axis parallel to that of said second backing roller and for movement toward and away from said second backing roller, a second pressure roller rotatably supported on said movable frame with its axis parallel to that of said first backing roller, a third backing roller rotatably supported on said movable frame with its axis parallel to that of said second backing roller, a third pressure roller supported on said movable frame for rotation about an axis parallel to that of said third backing roller and for movement toward and away from said third backing roller; fluid pressure means for moving said movable frame toward said stationary frame to apply pressure to said beam elements between said first backing roller and said second pressure roller, fluid pressure means on said stationary frame for moving said first pressure roller toward said second backing roller, fluid pressure means on said movable frame for moving said third pressure roller toward said third backing roller, first drive means on said stationary frame for driving said first backing roller and second drive means on said movable frame for driving said second pressure roller to advance said beam elements along said path of travel.

14. A machine as claimed in claim 13, in which said movable frame is movably mounted on a base and said means for moving said movable frame acts between said movable frame and said base, said base being movable toward and away from said stationary frame, and means for securing said base in selected position relative to said stationary frame.

15. A machine as claimed in claim 13, further comprising a second movable frame, a second set of guide rollers mounted on said second movable frame and corresponding to said second pressure roller, third backing roller and third pressure roller, said second set of guide rollers being spaced along said path of travel from the guide roller mounted on said first mentioned movable frame, fluid pressure means for moving said third pressure roller of said second set toward the corresponding third backing roller and separate fluid pressure means for moving said second movable frame toward said stationary frame.

References Cited in the file of this patent
UNITED STATES PATENTS

| | | |
|---|---|---|
| 1,797,795 | Ruhr | Mar. 24, 1931 |
| 2,179,802 | Sykes | Nov. 14, 1939 |
| 2,198,264 | Caputo | Apr. 23, 1940 |
| 2,605,732 | Anderson | Aug. 5, 1952 |